Nov. 24, 1931.  C. S. ASH  1,833,879
BALANCING MEANS FOR MOTOR VEHICLE WHEELS
Filed Aug. 15, 1928   2 Sheets-Sheet 1

Inventor
Charles S. Ash,
By
Attorneys

Nov. 24, 1931.    C. S. ASH    1,833,879
BALANCING MEANS FOR MOTOR VEHICLE WHEELS
Filed Aug. 15, 1928    2 Sheets-Sheet 2
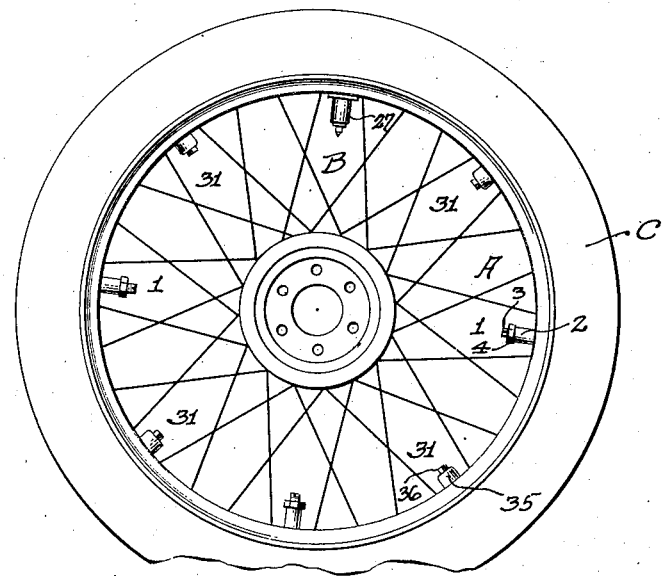
Fig. 7.
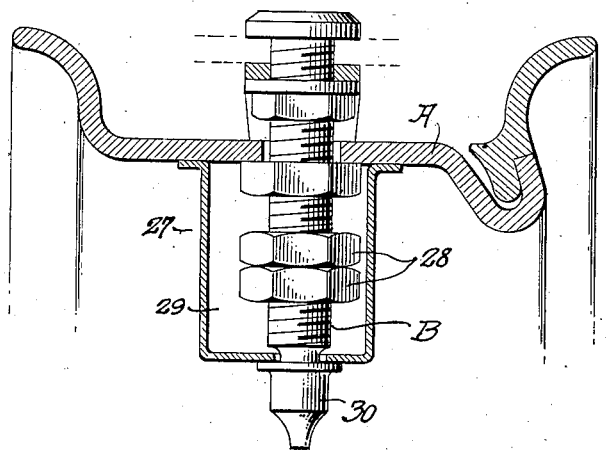
Fig. 8.
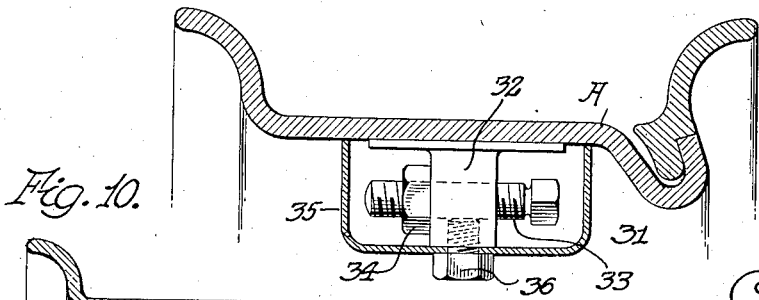
Fig. 9.
Fig. 10.
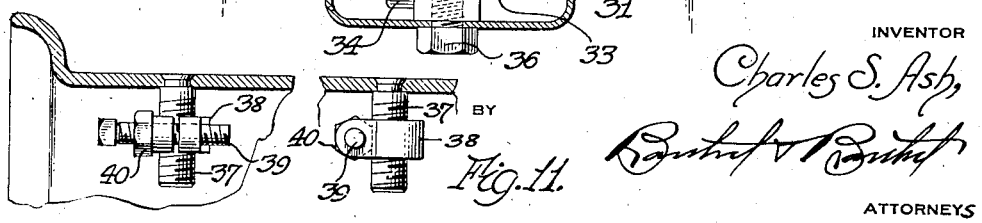
Fig. 11.
INVENTOR
Charles S. Ash,
BY
ATTORNEYS Patented Nov. 24, 1931

1,833,879

UNITED STATES PATENT OFFICE

CHARLES S. ASH, OF ROYAL OAK, MICHIGAN, ASSIGNOR TO KELSAY-HAYES WHEEL CORPORATION, OF DETROIT, MICHIGAN, A CORPORATION OF NEW YORK

BALANCING MEANS FOR MOTOR VEHICLE WHEELS

Application filed August 15, 1928. Serial No. 299,772.

This invention relates to an attachment for vehicle wheels and more particularly to an attachment for balancing the unbalanced weight of a motor vehicle wheel and parts applied thereto, especially when equipped with balloon tires, the object of the invention being to provide a perfectly balanced wheel when fully equipped and mounted to give a running balance and thereby eliminate vibration or what is commonly known as "shimmy". A further object is to provide a device which may be quickly and accurately adjusted to vary its balancing effect and which is of simple construction and cheap to manufacture.

Other objects of the present invention are to provide in combination, a series of separately adjustable members distributed throughout the peripheral portion of the wheel together with adjustable weight means applied to the tire valve stem, whereby a running balance may be secured, and to further insure a perfect running balance by providing weight members adjustable laterally of the wheel thereby securing a lateral as well as a peripheral running balance.

With the above and other ends in view the invention consists in providing a wheel part with a counterbalancing weight member which is adjustable radially of the wheel to vary the effect of such weight in counterbalancing the unbalanced weight of the wheel or parts mounted thereon, and further to provide a series of separately adjustable weight members together with radially adjustable weight means applied to the tire valve stem, and also a series of laterally adjustable members for effecting lateral running balance. The invention also resides in the construction of such members and in their combination and arrangement all as hereinafter set forth and more particularly pointed out in the appended claims, reference being had to the accompanying drawings in which Figure 1 is a side elevation of a wheel provided with devices illustrative of the present invention;

Figure 1:
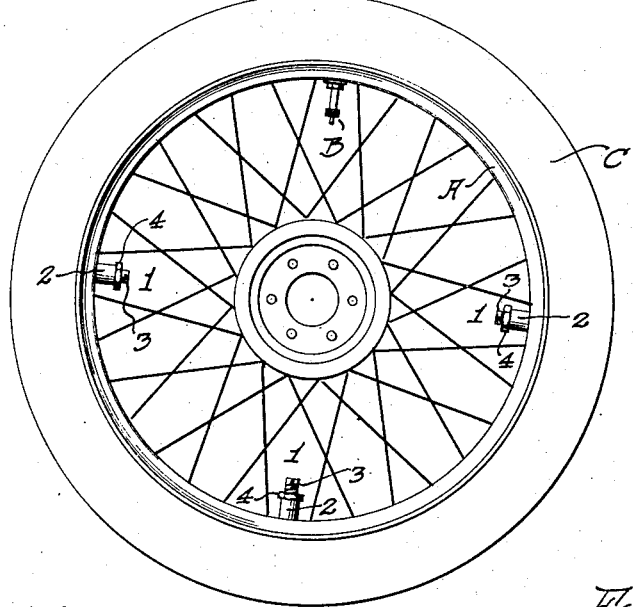
Figure 4:
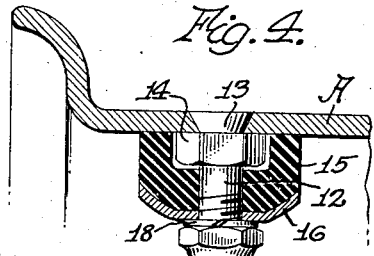
Figure 5:
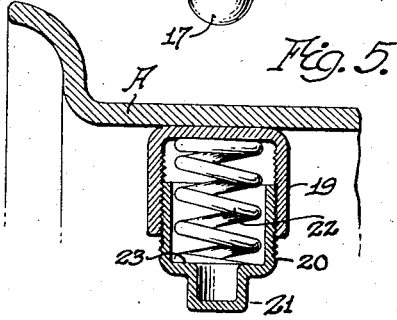
Figure 6:
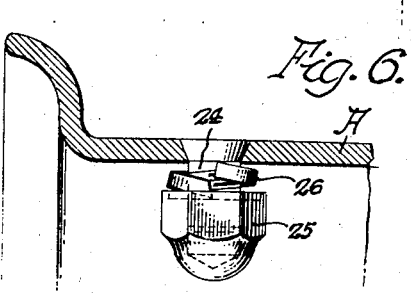

Figures 4, 5, and 6 are like views showing further modified forms;

Figure 7 is a view similar to Figure 1 showing an arrangement of devices as applied to a wheel and including devices adjustable laterally of the wheel and weight means adjustable upon a valve stem of a tire mounted upon the wheel;

Figure 8 is a cross-sectional view of a rim showing a tire valve stem in place thereon with weight means adjustable upon the stem;

Figure 9 is a view similar to Figure 8 showing a form of lateral adjustable weight means applied to the same; and Figures 10 and 11 are views illustrating a modification of the construction shown in Figure 9.

Motor vehicle wheels may be statically balanced with comparatively little difficulty but to provide a perfect running balance requires a very accurate distribution of weight both peripherally and laterally of the wheel, lateral balance being necessary largely due to the fact that the front or steering wheels are set at an inclination to the perpendicular. Further, it is necessary at times to change tires, and while the tire equipped wheels of the car may be perfectly balanced in the factory, a change of tires may throw the wheels entirely out of balance and unless some convenient means is provided for adjustment, the car will "shimmy" at high speeds. In order to secure and maintain a running balance I have provided weight means conveniently adjustable radially of the wheel to change the balancing effect thereof and also adjustable laterally of the wheel to effect a lateral running balance, and to give a more even weight distribution and insure a more perfect running balance, I have provided weight means adjustable upon the tire valve stem which is counterbalanced by other balancing devices distributed along the peripheral portion of the wheel. The combination, arrangement and distribution of these devices effects a running balance and by making these several devices quickly and easily adjustable, such balance may be maintained.

Figure 2:
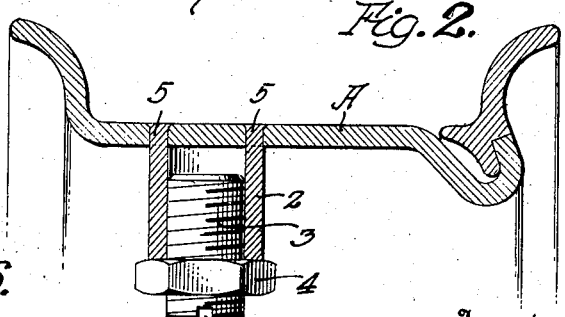
Figure 2 is an enlarged cross section of a wheel rim and device attached thereto partly in section and partly in elevation embodying the invention.

Each of the counterweights or balancing devices 1 shown in Figures 1 and 2 of the drawing, comprises a tubular, internally screw-threaded casing 2 adapted to receive an externally screw-threaded plug 3 adapted to be adjusted inwardly or outwardly of the casing by screwing the plug in or out, the plug being locked in adjusted position by a lock nut 4 on the projecting outer end of the plug to be turned up hard against the end of the casing and lock the plug against accidental rotation.

One or more of these balancing devices 1 may be secured to the rim A of a wheel at intervals throughout the inner periphery thereof, one of such devices being preferably located diametrically opposite the valve stem B of the tire C mounted on the rim, the plug 3 of each device extending radially inward from the rim so that by screwing the plug inwardly or outwardly in its casing, the effect of the weight of the plug in balancing the unbalanced weight of the wheel, tire or other parts may be varied until a running balance of the tire equipped wheel is secured, and when such adjustment is effected the lock nuts 4 are tightened to prevent the plug from turning and affecting the balance of the wheel.

The casing 2 of each device is secured to the wheel rim A by forming the casing with end lugs 5 to engage within openings in the rim, said lugs being riveted down in said openings to secure the casing end firmly against the rim surface, and the outer end of the plug 3 is preferably formed with a transverse slot 6 so that the plug may be readily turned by means of a suitable tool, thus facilitating the adjustment. A device of this character may be adjusted conveniently at any time and therefore should the balance of the wheel be affected by changing a tire or from any other cause, the defect may be quickly and easily corrected.

Figure 3:
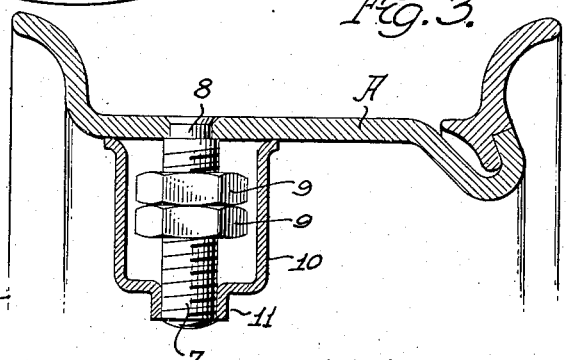
Figure 3 is a similar view showing a modified form of device.

The modified form of counter-weight or balancing device shown in Figure 3 comprises a screw stud 7 having a reduced end portion 8 mounted in an opening in the rim A and secured therein by riveting down the outer end of the reduced portion. On this stud are two nuts 9 forming adjustable weights which may be moved radially of the wheel by screwing them in or out on the stud, these weights being locked, when so adjusted, by turning them in opposite directions to bring them into frictional contact with each other. The stud and nuts are enclosed within a cup-shaped casing 10 having an internally screw-threaded end portion 11 to receive the free end of the stud. By screwing the casing on to the stud, the open end of the casing is forced against the surface of the rim and is thereby held against working loose. The casing protects the stud and nuts against dirt and water and forms a finish for the device so that it will present a good appearance.

The device shown in Figure 4 comprises a bolt 12 having a head 13 to seat in a tapered opening in the rim and is firmly secured in place by a nut or collar 14 on the bolt engaging the inner surface of the rim A. Sleeved on this bolt is a cup member 15 of rubber or other yieldable and flexible material enclosing the nut or collar 14 and seated against the rim, and a metal cap 16 has a central opening to receive the bolt and is shaped to conform to the shape of the end surface of the cup 15. A cap nut 17 on the free end of the bolt has a lock washer 18 interposed between it and the cap 16 and this cap nut is formed so that it may be screwed on to or off the bolt and thus adjust it and the cap 16 toward or from the rim, the cup 15 being compressed or permitted to expand in effecting such adjustment. The effective weight of the parts is thus adjusted radially of the wheel.

A further modified form of adjustable weight device is shown in Figure 5, this construction including a cup member 19 spot-welded or otherwise firmly fixed to the inner surface of the rim to extend radially inward therefrom with its inner end open to receive an adjustable hollow plug or weight member 20, the cup being internally screw-threaded to engage the external screw-thread of the plug. A reduced end portion 21 of the plug is formed to receive a wrench or other tool for turning the plug to adjust it radially of the wheel, and to hold said plug against turning after adjustment, a coiled spring 22 is placed in the cup under compression between the bottom of the cup and the internal shoulder 23 of the closed end of the plug formed by reducing said end in diameter in forming the end portion 21. In this construction it is only necessary to apply a wrench to the plug and turn it in or out to adjust it radially and effect a counterbalancing of the unbalanced weight of wheel or tire.

In the construction shown in Figure 6, a screwthreaded stud or bolt 24 similar to the bolt 12 is employed and on this stud is mounted a nut 25 similar to the nut 17 with a split lock-washer 26 interposed between said nut and rim. Turning of the nut 25 will adjust the same radially of the wheel to vary its effect in balancing the wheel.

In each of these constructions shown, the effect of the counterbalance weight is varied by an adjustment of the member radially of the wheel and therefore a very accurate adjustment is secured to give to the tire equipped wheel a perfect running balance, and such adjustment may be very quickly and accurately effected, due to the construction.

In order to secure a more nearly perfect running balance, it may be found of advantage to add weight to the valve stem B of the tire C, and due to the inclination of the front or steering wheels of a vehicle, it may be necessary in order to secure a perfect running balance, to adjust laterally, the added weight. By arranging and distributing the several adjustable weight devices as indicated in Figure 7, a perfect running balance of the fully equipped wheel when mounted on the steering knuckle of its axle, is secured by the proper adjustment of these devices.

In Figure 8, a weight device indicated as a whole by the numeral 27 applicable to the valve stem B of a tire, is shown, said device comprising two nuts 28 screwed upon the usual externally screw-threaded valve stem B so that they may be adjusted radially of the wheel, and a cap 29 encloses the stem and weights to protect them from dirt and water, said cap being held in place, by a cap nut 30 on the end of the stem. By turning this cap 29 which is held eccentrically to the valve stem axis by offsetting the hole in the end thereof through which the stem extends, the cap may be adjusted laterally of the wheel and by these adjustments the unbalancing weight of the valve stem may be varied to secure a more accurate counter-balancing by the other devices applied to the rim.

Figure 9 discloses a weight device indicated as a whole by the numeral 31 which device is adjustable laterally of the wheel said device comprising a lug 32 secured in any suitable manner to the wheel rim or other peripheral part of the wheel and this lug is provided with a transverse screwthreaded opening to receive a bolt 33 which may be screwed in or out to change its position relative to the plane of the center line of the rim and thus throw a preponderance of its weight to one side or the other of this plane, effecting a lateral balance of the wheel. When so adjusted, the bolt 33 is locked in adjusted position by a lock-nut 34 turned up hard against the side of the lug, and a cup 35 encloses and protects the lug and bolt, said cup being detachably held in place by a stud bolt 36 screwed into the inner end of said lug.

Figures 10 and 11 disclose a construction similar to that shown in Figure 9 with the exception that the device is adjustable both radially and laterally of the wheel by mounting upon a screw-threaded stud 37 secured to the rim, an internally screw-threaded split collar 38 with a transverse bolt 39 engaging openings in the split ends of the collar, said bolt serving to clamp the collar to the stud and at the same time serving as a transversely adjustable weight member. By loosening the lock nut 40 the bolt may be turned to adjust it endwise and the collar with the bolt may be adjusted radially of the wheel by turning it upon the stud.

As shown in Figure 7, a perfect running balance of the wheel both laterally and peripherally is secured by providing a balancing device for the valve stem B, affixing balancing devices 1 or one of the modified forms thereof, at proper intervals to the rim, and providing balance devices 31 at intermediate points to secure lateral as well as peripheral balance. Where the form of device shown in Figure 10 is employed, the number of devices may be decreased due to the fact that this form is adjustable both radially and laterally.

It is obvious that other constructions for the purpose of providing radial or lateral, or both radial and lateral adjustment may be employed, and I do not therefore limit myself to any one particular construction shown, except as specifically set forth in certain of the appended claims, and the terms used in describing the invention as illustrated, are intended to include mechanical equivalents and other combinations embodying the same principles of operation.

What I claim is:

1. Balancing means for a vehicle wheel assembly comprising a weight device secured to the rim member of the wheel assembly and means providing for adjustment of said device both laterally of the wheel and toward and away from the axis thereof.

2. Balancing means for a vehicle wheel assembly comprising a plurality of weight devices mounted upon the rim of the wheel assembly and means providing for adjustment of said devices both axially and radially of the wheel to effect a running balance.

3. Balancing means for a vehicle wheel assembly comprising a weight device including a member secured to the rim of the wheel assembly and extending inwardly therefrom, a weight member rotatably mounted upon the member aforesaid for adjustment toward and away from the rim and means providing for adjustment of said weight member laterally of said first-mentioned member.

4. Balancing means for a vehicle wheel assembly comprising a weight member and a member substantially enclosing the weight member mounted for adjustment relative to the latter laterally of the wheel.

5. Balancing means for a vehicle wheel assembly comprising a weight device secured to the rim member of the wheel assembly and means providing for adjustment of said device laterally of the wheel to secure a running balance.

6. Balancing means for a vehicle wheel assembly comprising a weight device carried by the rim member of the wheel assembly and means providing for adjustment of said device axially of the wheel.

In testimony whereof I affix my signature.

CHARLES S. ASH.